United States Patent [19]

Dittner et al.

[11] Patent Number: 4,511,971
[45] Date of Patent: Apr. 16, 1985

[54] ANTILOCKING BRAKE SYSTEM

[75] Inventors: Adam Dittner, Hochstadt; Heinrich Schurr, Herzogenaurach; Ducius Von Wallenberg, Erlangen, all of Fed. Rep. of Germany

[73] Assignee: Fag Kugelfischer Georg Schäfer & Co., Schweinfurt, Fed. Rep. of Germany

[21] Appl. No.: 377,031

[22] Filed: May 11, 1982

[30] Foreign Application Priority Data

May 14, 1981 [DE] Fed. Rep. of Germany ....... 3119144

[51] Int. Cl.$^3$ .................. B60T 8/08; G06F 15/20
[52] U.S. Cl. .................................. 364/426; 303/105; 303/110
[58] Field of Search .................. 364/424, 426; 303/91, 303/93, 95, 97, 99, 103, 105, 110, 119

[56] References Cited

U.S. PATENT DOCUMENTS

| 3,663,069 | 5/1972 | Perry et al. | 303/104 |
| 3,907,377 | 9/1975 | Mayer | 303/102 X |
| 3,938,612 | 2/1976 | Boudeville et al. | 364/426 X |
| 3,951,466 | 4/1976 | Guagliumi et al. | 303/103 X |
| 4,209,203 | 6/1980 | Brearley | 303/103 X |
| 4,269,455 | 5/1981 | Beck et al. | 303/110 X |
| 4,395,761 | 7/1983 | Sato et al. | 364/426 |
| 4,414,630 | 11/1983 | Harris et al. | 364/426 |

FOREIGN PATENT DOCUMENTS

| 2056967 | 11/1970 | Fed. Rep. of Germany | 364/426 |
| 2127073 | 6/1971 | Fed. Rep. of Germany | 364/426 |
| 2145433 | 9/1971 | Fed. Rep. of Germany | 303/71 |
| 2363527 | 12/1973 | Fed. Rep. of Germany | 364/426 |
| 2110899 | 3/1979 | Fed. Rep. of Germany | 303/97 |

Primary Examiner—Felix D. Gruber
Attorney, Agent, or Firm—Karl F. Ross; Herbert Dubno

[57] ABSTRACT

An antilocking brake system responds to a deceleration above about 12 m/s$^2$ and resulting from overbraking to cut off the master cylinder from the wheel brake cylinder and effect braking-force reduction. When the deceleration falls below about 10 m/s$^2$, a threshold discriminator is effective to signal the state of an interval of further braking-force reduction which is a function of twice the rotational moment of inertia of the wheel and after which the braking force is held substantially constant for a predetermined time.

7 Claims, 4 Drawing Figures

ANTILOCKING BRAKE SYSTEM

FIELD OF THE INVENTION

Our present invention relates to an antilocking brake system and, more particularly, to a system designed to prevent locking of a nondriven wheel of a vehicle when a skidding condition may arise.

BACKGROUND OF THE INVENTION

It is well known that one of the dangers in the operation of automotive vehicles is the locking of the braked wheels so that effective braking of the vehicle cannot continue and a dangerous situation may arise because the locked wheel tends to skid on the road surface.

Put otherwise, for four-wheel passenger vehicles, tractors, aircraft and, indeed, any vehicular system in which a wheel engages the ground with rolling friction, effective braking and control of the vehicle is only possible as long as the wheel continues to roll along the ground or any interruption of the rolling during braking is at best momentary. Should the wheel lock, while the vehicle still has continuous momentum, uncontrolled sliding friction develops and skidding occurs.

The effect is most noticeable upon icy surfaces where locking of the wheel, while the vehicle has considerable momentum, represents practically complete loss of control since the sliding friction between the wheel and the ground surface is a minimum.

An experienced vehicle operator is able to avoid such situations or successfully extricate himself from such situations by avoiding overbraking entirely but, if such overbraking should occur, by briefly relieving the wheel-brake pressure and thus engaging in a stepped braking action. Since such operations require great sensitivity on the part of the vehicle operator and the instinct of the operator is not always sufficient, automatic systems have been developed to assist the operator in antiskid control of vehicle brakes. In these systems, the locking of the wheel is generally detected and the pressure in the wheel-brake cylinder may be relieved to undo the locking of the wheel.

These systems have not, however, been fully satisfactory, especially because they tend to generate a vibratory action which coincides with resonance of the vehicle and builds up undesirable vibrations in the vehicle.

In other cases, the braking force controller tends to react upon the braking lines and the wheel brake cylinder, creating considerable discomfort for the operator.

OBJECTS OF THE INVENTION

It is, therefore, the principal object of the present invention to provide an improved antilocking wheel-brake system whereby the disadvantages of earlier systems are obviated.

Another object of this invention is to provide a wheel-brake system which is especially effective for the nondriven wheels of a vehicle and is also effective for vehicles with both driven and nondriven wheels.

Still another object of the invention is to provide a brake system for the purposes described which will not create vibrations in the vehicle and also will not create an unpleasant situation for the operator.

SUMMARY OF THE INVENTION

These objects and others which will become apparent hereinafter are attained, in accordance with the invention, in antilocking systems for a nondriven vehicle wheel which comprises means for measuring the deceleration of the wheel, a pair of threshold discriminators responsive to the latter means for reducing an output when the deceleration is in excess of the first threshold which is greater than about 10 m/s$^2$, say, about 12 m/s$^2$, and an output when the deceleration falls below a second threshold of about 10 m/s$^2$.

The two threshold discriminators are utilized to selectively create setpoint values for a comparator which receives an actual value signal representing the position of a setting or servopiston which can control the braking force and, according to an important feature of the invention, operates a valve adapted to cut off the master cylinder from the wheel-brake cylinder so that the servopiston can relieve the pressure in the wheel-brake cylinder.

According to another important feature of the invention, after the first threshold is reached, the setpoint value is delivered to a comparator such as to effect braking-force reduction until the second threshold is reached, whereupon an additional braking-force reduction is permitted by modification of the setpoint value in an amount determined by the moment of inertia of the wheel and preferably by twice the moment of inertia of the wheel.

When the additional brake-force reduction has been concluded, moveable member of the servovalve is shifted by the electrohydraulic control system to prevent further operation of the servopiston and hence change in the braking force for a brief period.

This period, during which the velocity of the wheel can increase, can be established by an electronic time delay network which responds to a sample-and-hold circuit and works operates flip-flop to switch over the setpoint value generator for the comparator.

When the system is used on a vehicle having driven wheels as well, we have found it to be advantageous to provide the driven wheel brake force reducer in a follower circuit.

Thus, for example, when the nondriven wheel is provided with the antilocking system previously described, means is provided to determine the difference in speeds of the two wheels. This difference means can work into the braking force reducer of the driven wheel to control it.

BRIEF DESCRIPTION OF THE DRAWING

The above and other objects, features and advantages of the invention will become more readily apparent from the following description, reference being made to the accompanying drawing in which.

SPECIFIC DESCRIPTION

Figure 1:
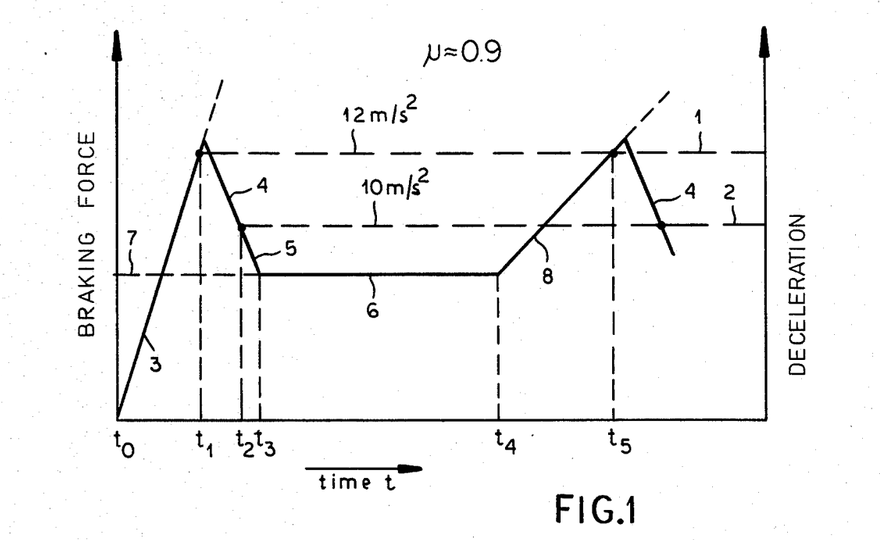
FIG. 1 is a graph illustrating the braking force characteristic versus time for one surface of given friction characteristics.

In FIG. 1 the braking force is plotted along the left-hand ordinate while the right-hand ordinate displays the deceleration, i.e. the rate at which the angular velocity of the wheel is reduced. Time is plotted along the abscissa.

The graph has been shown for a wheel provided with the antilocking system according to the invention.

As previously mentioned, the purpose of a locking system is to prevent overbraking which could lead to skidding if the wheel lies relative to the vehicle while the latter continues to move with respect to the ground surface engaged by the wheel. Under these conditions, the wheel no longer engages the ground or road surface with rolling friction, but has a tendency to slide thereover. For the graph of FIG. 1 a coefficient $\mu$ of sliding friction of about 0.9 is assumed.

The reference numeral 1 represents the threshold value of the first threshold discriminator according to the invention here set at a threshold of 12 m/s$^2$. The threshold of the second discriminator is represented at 2 and is here set at exactly 10 m/s$^2$.

The braking-force curve rises sharply as shown at 3, assuming that the driver has fully applied the brake by full depression of the brake pedal at the time $t_o$.

The braking-force regulator system of the invention, i.e. the antilocking system, is brought into play as soon as the ramp 3 crosses the threshold 1 of 12 m/s$^2$, i.e. at the time $t_1$.

The braking force is thereby reduced along the descending ramp 4.

When the deceleration and braking force cause the curve 4 to cross the second threshold 2 of 10 m/s$^2$, at $t_2$, the antiblocking system is again deactivated in a manner to be described in greater detail hereinafter.

However, it should be noted that in all cases after the curve 4 crosses the second threshold according to the invention, a continued reduction in the braking force represented by the portion 5 of the characteristic and determined by the rotational inertia of the wheel will be required. After this point ($t_3$) the speed of the wheel can again be increased because further reduction of the brake force is terminated. The length of the segment 5 of the curve is substantially independent of the coefficient of friction $\mu$. We have, however, found that it is advantageous to choose a value for the duration of the additional reduction in braking which corresponds to that required to brake twice the rotational inertia or inertial torque (moment) of the wheel.

As soon as the predetermined additional (inertia-overcoming) brake-force reduction is completed at $t_3$, a holding time 6 at the level 7 is triggered during which the braking force which continues to be applied is held substantially constant. This residual braking force represented at 7 can be comparatively high but in any case will be determined by the frictional coefficient. When the frictional coefficient is relatively good, as in the case of the example represented in FIG. 1, the residual braking force can be relatively high.

In general it can be seen that with a good coefficient of friction the braking-force reduction can be comparatively small, at least by comparison to the total braking force applied.

Upon the lapse of the holding time 6, i.e. at $t_4$, braking-force reduction is cancelled so that the braking force rises as represented by the ramp 8. If the coefficient of friction $\mu$ has remained constant when the braking force again brings about a deceleration exceeding the threshold value of 12 m/s$^2$, i.e. at time $t_5$, the control cycle is repeated.

Figure 2:
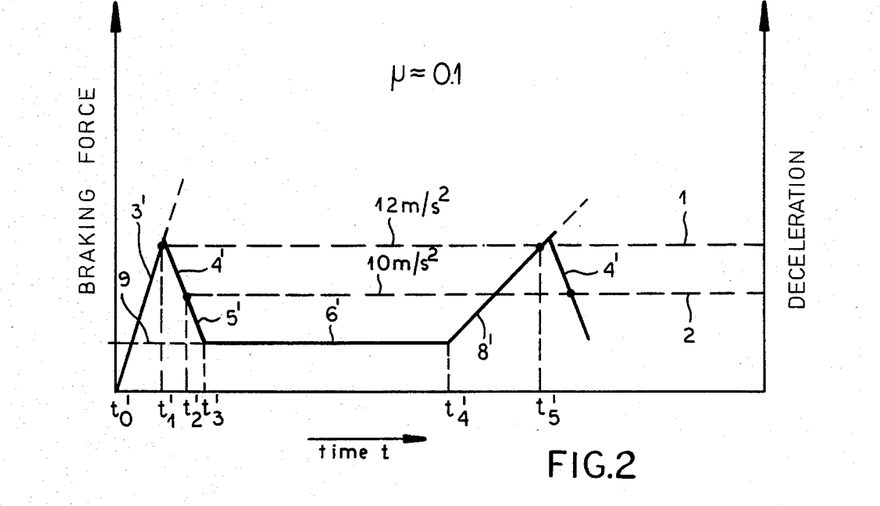
FIG. 2 is a graph illustrating the braking force of another surface with a different friction characteristic.

FIG. 2 shows a similar graph, i.e. an antilocking cycle, for a system operating with an extremely low coefficient of friction ($\mu = 0.1$) which can be the case for roads covered with sheet ice.

Even with a comparatively low braking force (ramp 3') the first threshold value 1 of 12 m/s$^2$ will be exceeded rapidly ($t_1'$) to trigger the reduction in braking force. This reduction of the braking force is effected as described in connection with FIG. 1. Whereas the residual braking force 7 in the example of FIG. 1 was comparatively high, the residual braking force in the example of FIG. 2, here represented by the reference numeral 9, is extremly low as is the case for poor friction conditions.

The other reference characters in FIG. 2 have been designated with the same numerals as those of FIG. 1, to the extent that they represent analogous values although they have been primed.

Figure 3:
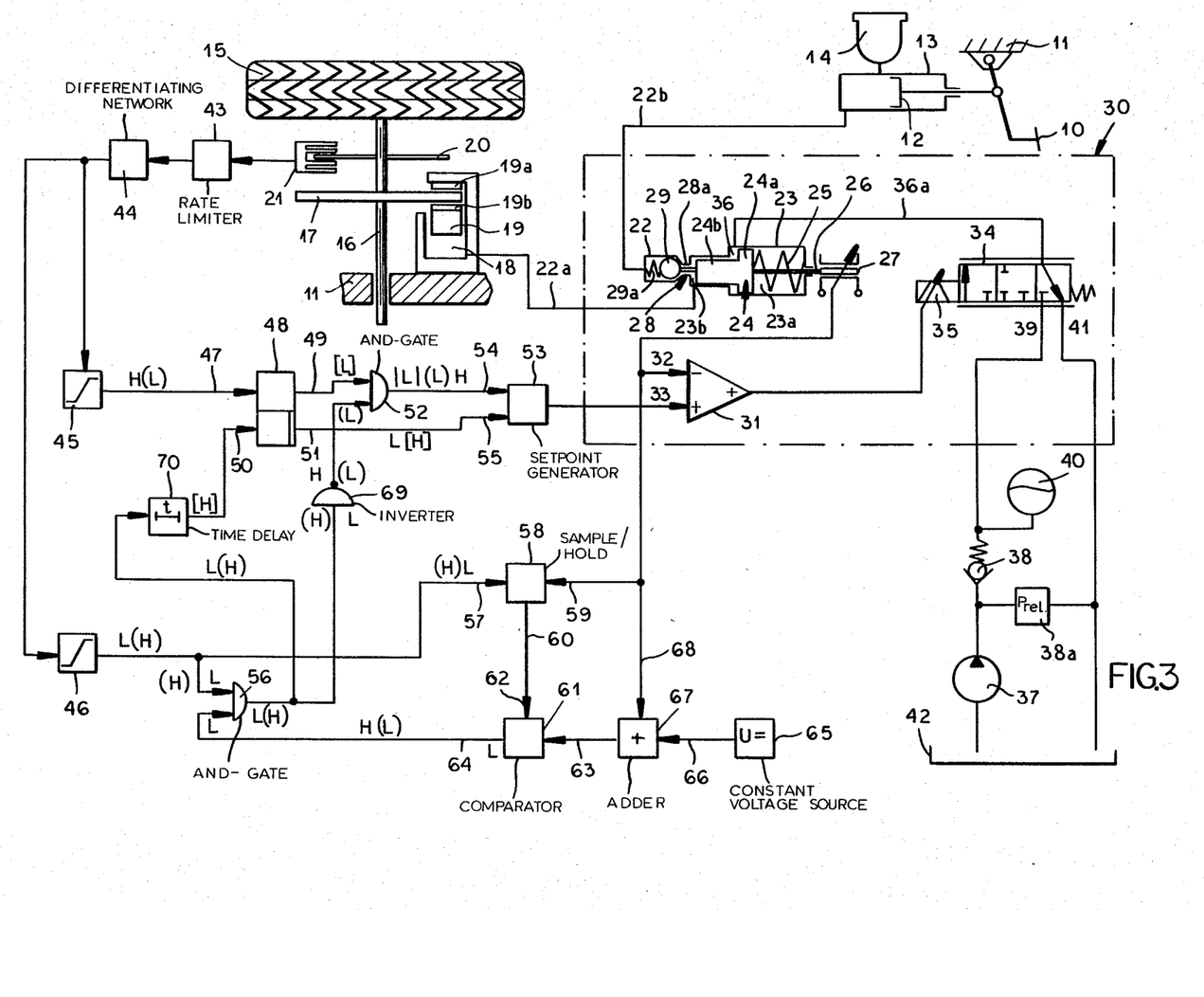
FIG. 3 is a diagram illustrating the system of the invention as applied to a nondriven wheel.

As can be seen from FIG. 3, a vehicle equipped with an antilocking system in accordance with the present invention, can comprise a chassis 11 upon which a brake pedal 10 is pivotally mounted, the brake pedal operating the usual foot brake master cylinder 13 which has been shown, together with other hydraulic circuit elements, in a highly diagrammatic form.

The master cylinder comprises a piston 12 and a brake fluid reservoir represented at 14.

Equalization and compensating chambers and passages, foot valves, check valves and tandem systems, common in automotive practice, can also be used but have not been illustrated so that the more simplified version shown can permit the invention to be appreciated more readily.

The wheel 15 to be braked has also not been shown in any great detail but comprises an axle or shaft 16 which is rotatable relative to the chassis 11. This wheel can be provided with a spring, torsion bar and/or shock absorber suspension of any conventional design and may even be a steerable wheel in which case the housing portion shown can be considered to represent the steering knuckle.

In any event, the shaft 16 is provided with a brake disc 17 cooperating with a wheel-brake cylinder 18 of a disc brake whose piston 19 urges the usual brake pads or shoes against opposite sides of the disc when the brake pedal is depressed. Any conventional disc brake may be used for this purpose, i.e. a disc brake whose yoke straddles the disc and is provided with a wheel-brake cylinder whether the yoke is fixed to the chassis and the disc is axially movable or the disc is axially fixed and the yoke can be shifted to ensure that both brake pads engage the disc.

Furthermore, instead of a disc brake, a drum-type brake can be used. In such systems, a brake drum is connected with the wheel hub or shaft, and arcuate brake shoes may be pressed outwardly when the wheel-brake cylinder is supplied with the fluid.

Both types of wheel brakes are known in the art.

According to the invention, moreover, the wheel or shaft 16 is provided with a disc 20 for an angular velocity-measuring instrument generally represented at 21, e.g. a tachometer.

Reference may be had to German Pat. No. 25 21 163 in this respect.

The latter tachometer generates an analog output representing the angular velocity or rotary speed of the wheel in the form of a pure direct voltage which can represent high speeds as well as very low speeds.

One of the advantages of the use of a tachometer of the latter type is that it remains effective at extremely low speeds so that the antiblocking and antiskid system of the invention can operate to speeds practically of standstill. Most earlier antiskid systems are not effective at such low speeds.

The brake system can comprise a valve 22 to be described subsequently.

Valve 22 forms part of a brake-force reduction cylinder 23 which is stepped and receives a piston 24, hereinafter referred to as the setting piston or servopiston.

The large diameter step 24a of this piston divides the cylinder 23 into a working compartment 36 in which the piston has an effective surface area, and a compartment 23a which receives a spring 25 urging the piston to the left, i.e. in a direction tending to reduce the effective volume of chamber 36.

The small diameter step 24b of the piston 24 has its end exposed to fluid pressure in a compartment 23b which communicates by a passage 28 with the valve 22.

Thus, when the setting piston 24 is immobile in the position shown, fluid is forced past the valve 22 which can have a ball or other valve member 29 biased by a spring 29a to obstruct flow through the passage 28 when the piston 24 is shifted to the left.

The fluid passing valve 22 is delivered to the wheel-brake cylinder 18 to bring the brake pads 19a and 19b into engagement with brake disc 17.

When the brake pedal 10 is released, the fluid flows via the brake lines 22a and 22b to the master cylinder.

Braking force is reduced by the delivery of fluid via a line 36a to the chamber 36 to shift the piston 24 to the right against the force of the spring 25 and thereby enlarge the chamber 23b.

The displacement of the setting piston 24 is measured by a displacement detector 27 operating in an analog mode and constituted, for example, by a linear differential transformer.

Other displacement-measuring devices as shown and described in this publication may also be used. The movable member of the displacement-measuring unit 27 is connected to the piston 24 by the actuating rod 26.

In the indicated position of the setting piston 24, the system is in its normal or starting condition. A rod 28a passing through the port 28 maintains the ball 29 slightly lifted from its seat in the valve 22.

This provides a free hydraulic flow path from the master cylinder 13 of the brake via the open valve 22 to the wheel-brake cylinder 18.

Spring 25 is dimensioned so that it is sufficiently strong that only a substantial braking force upon the piston 24 to the right can press the latter against the force of this spring to close the valve 22. This braking force must be significantly greater than that required to reach the first threshold 1 of FIG. 1 is previously described.

As a consequence, until the aforementioned thresholds are reached, completely normal braking of wheel 15 is possible by operation of the brake pedal 10.

This also means that the conventional braking function remains effective in spite of any breakdown in the antiblocking system since, in the case of any such breakdown, the piston 24 will remain in its normal position as shown in FIG. 3 and conventional braking via the brake pedal 10, the master cylinder 13 and the wheel brake 18 can continue.

An important feature of the present invention is the electrohydraulic analog control circuit which effects the operation of the wheel-brake cylinder 18 as need arises. This control system is generally designated by the reference numeral 30.

The system comprises the previously mentioned control cylinder 23 which functions as a brake-force reducing cylinder when fluid is delivered under pressure to compartment 36, thereby pressing back or balancing the effect of the spring 25 and shifting the piston 24 from the normal position shown to a position in which the ball 29 can close the connection between the master cylinder and the wheel-brake cylinder and the chamber 23b can be expanded.

The cylinder 23, compartment 36 and the wheel-brake cylinder 18 collectively, therefore, can be considered the operator or effector of the control system.

The control system 30 also includes a comparator 31 receiving a setpoint signal and an actual value signal. In accordance with conventional control system practices, the comparator 31 compares the setpoint value represented by the setpoint signal with the actual value represented by the actual value signal and forms a difference signal which is applied at 31a to a solenoid or magnetic coil 35 which operates a valve in the form of a rapid action servovalve 34 of which the cylinder 23 can be considered a follower cylinder. The valve 34 is of the three-port, three-position type and has a blocking position between a forward-flow and a reverse-flow position as will be described in greater detail hereinafter.

The valve 34 forms the actuator of the control system which comprises the usual information collecting means, i.e. the sensors, information processing means in the form of discriminators and comparator, actuator means responsive to the processed information, and operator means for performing a corrective task in response to the actuator.

The valve 34, therefore, can deliver hydraulic fluid to or drain hydraulic fluid from the chamber 36 in response to the difference signal produced by the comparator 31.

A valve of this type is described in German Pat. No. 26 02 375.

A pump 37 provides fluid for the control circuit from a reservoir 42 and feeds the fluid via a check valve 38 and a pressure accumulator 40 to the input port 39 of the servovalve 34, the discharge port 41 being drained to the reservoir. The pressure accumulator 40 eliminates surges on opening and closing of the valve 34 with which it is in parallel and a pressure-relief valve 38a may connect the outlet side of the pump with the reservoir to prevent locking of the pump under conditions when there is no flow to the port 39.

The tachometer 21 is connected directly to a rate limiter 43 responding to the rate of change and hence the rate of change of the velocity or acceleration which provides the input to a differentiating network 44.

Two threshold discriminators 45 and 46 can be connected to the differentiator. Such threshold circuits may be Schmitt trigger circuits.

The threshold discriminator 45 is set to respond to the upper or first threshold 1 (see FIG. 1) and provides an output signal when a threshold value of 12 m/s$^2$ of deceleration is crossed, representing overbraking by the vehicle operator.

The threshold discriminator 46 is set to provide an output signal when the deceleration of the wheel is less than 10 m/s$^2$.

The rate limit 43 is provided to ensure that a speed-change signal will be generated, even in the event the wheel 15 is instantaneously blocked, i.e. is suddenly prevented from rotating. Obviously in this case, the rate of change will be pronounced as blocking occurs and both discriminators 45 and 46 will receive inputs via the differentiating stage 44.

The comparator 31 receives input signals from the threshold discriminators 45 and 46.

The threshold discriminator 45, for example, is connected to the upper input 47 of a bistable multivibrator in the form of a set-reset flip-flop 48 whose output 49 is connected to an AND-gate 52.

The other input 50 is connected to the time delay network 70 while the second output of the flip-flop 48, represented at 51, is delivered to a setpoint generator 53. The latter can be a conventional constant rate stage.

The AND-gate 52 has its output connected to the input 54 of the setpoint generator 53.

The setpoint generator 53 applies a setpoint signal to the setpoint input 33 of the comparator 31. The setpoint input is in the form of a voltage ramp, i.e. a voltage rising at a constant rate when an input is provided at 54 to the setpoint generator 53. When the input is applied at 55 to the setpoint generator 53, a descending ramp, i.e. a voltage decreasing at a constant rate, is delivered to the setpoint input 33.

The output of the threshold discriminator 46 is connected to one input of another AND-gate 56 and to one input 57 of a sample-and-hold circuit 58. The latter is provided with a further input 59 and an output 60.

The input 59 of the sample-and-hold circuit 58 is connected to the actual value input 32 of the comparator 31 and, of course, to the signal generator 27 which provides the actual value of the displacement of the piston 24.

The output 60 of the sample-and-hold circuit 58 is connected to a switchable comparator 61 which also has an input 63, in addition to the input 62, to which the sample-and-hold circuit is connected, and an output 64. A constant voltage source 65, providing a reference voltage, is connected to one input 66 of an adder 67 whose other input 68 receives the actual value applied to the input 32 of the comparator 31.

The output 64 of the switchable comparator 61 is connected to the other input of the AND-gate 56. The output of the latter is applied to the time delay circuit 70 and to an inverter 69. The inverter output is delivered to the other terminal of AND-gate 52 and the output from the delay line 70 applies an input only after a predetermined time interval following the appearance of an output at AND-gate 56 to the input 50 of the set-reset bistable circuit 48.

FIG. 3 of the drawing also shows the symbols "L" and "H" representing respectively low and high bistable operating stages for the digital circuit and facilitating the description below.

The operation of the circuit will first be described in terms of the action which occurs in the event of overbraking by the vehicle operator such that the deceleration of wheel 15 exceeds the threshold 1 of 12 m/s² at the time $t_1$ (FIG. 1).

At the threshold discriminator 45 an output is developed, this output being represented as H, i.e. one of the digital binary phases and shown without parenthesis. The H-potential is applied to the bistable set-reset circuit 48 and switches the latter so that an H-potential appears at its output 49 and is applied to the AND-gate 52.

Since the deceleration is also greater than the threshold 2 (FIG. 1) of 10 m/s², the threshold discriminator 46 outputs an L potential which corresponds to the L-potential applied by the AND-gate 56 to the inverter 69 so that an H-potential appears at the other input to the AND-gate 52. The latter thus outputs an H-potential to the setpoint generator 53 and produces at the input 33 to the comparator 31 a progressively rising setpoint voltage, i.e. an ascending ramp mentioned previously.

Because an L-potential also appears at the sample-and-hold circuit 58 from the threshold discriminator 46 no switching signal is provided to the comparator 61 so that its output 64 also is at an L-potential and the corresponding L-potential appears at the other input to the AND-gate 56 guaranteeing an L-potential at the output thereof and hence to the inverter 69.

The comparator 31 thus generates a significant difference signal since there has been no material shift in the position of the piston 24 and the difference signal produced by the comparator operates the servovalve 34 so that fluid flows from the pump 37 through line 36a into compartment 36.

The piston 24 is thereby shifted to the right, thereby closing valve 22 by allowing the ball 29 to be seated fully therein and cutting off the master cylinder 13 from the wheel-brake cylinder 18.

At the same time, the compartment 23b at the left-side of piston 24 is enlarged, thereby relieving pressure at the wheel-brake cylinder 18, reducing the hydraulic force applied to piston 19 and reducing the braking force. This operation corresponds to the descending ramp 4 of the braking force characteristic curve shown in FIG. 1. The consequence, of course, is a reduction in the deceleration of wheel 15.

As soon as the deceleration falls below 10 m/s², i.e. the threshold level 2 at time $t_2$ (FIG. 1), the threshold discriminator 46 is triggered to produce an H output, (shown in parenthesis) which signals the end of the brake force reduction.

This H-potential is applied to the upper input of AND-gate 56 as well as to the input 57 of the sample-and-hold circuit 58.

The sample-and-hold circuit 58 is thereby activated and stores the actual value which is at that instant applied to the input 59 and corresponds to the actual value applied at the same instant at 32 to the comparator 31.

In other words, when the deceleration falls below the second threshold, the actual value of the position of the braking-force controlling piston 24 is memorized in the sample-and-hold circuit 58.

This actual value is applied via the input 62 to the comparator 61 which simultaneously receives the reference voltage from source 65 via line 63 to which the actual value has been added. The signal applied at line 63, therefore, represents the sum $U_a + U_r$ where $U_a$ is the actual value appearing at 68 and 59 and $U_r$ is the potential delivered by the source 65.

Since the signal along lines 47-49 remains effective because the input 50 has not as yet been changed, further increase in the setpoint voltage occurs and consequently there is a further reduction in the wheel-braking force corresponding to the curve portion 5 which can be predetermined in accordance with the rotational moment of inertia of the wheel, i.e. a value corresponding to twice this moment.

As soon as the comparator 61 determines that the value stored at time $t_2$ is reached or undershot by the sum $U_a + U_r$ applied to the input 63, as is the case at time $t_3$ (see FIG. 1), the comparator 61 delivers to the AND-gate 56 and H-potential. As a consequence, at the output of the AND-gate 56 and at the input to the time delay network 70, H-potentials are to be found and the corresponding H-potential is applied to the inverter 69.

The output from the inverter 69 is thus at an L-potential and this is applied to the lower input of the AND-gate 52.

The output of this AND-gate is also L, terminating further reduction in the brake force and holding the latter substantially constant at its last value because the servovalve 34 is shifted into its middle or blocking position, thereby locking the piston 24.

In a typical case, this period of constant brake phase, corresponding to the time interval between $t_3$ and $t_4$ and the stretch 6 of the curve in FIG. 1, can be about 200 milliseconds.

This time interval set by the time delay network 70 can be established in accordance with the capacity of the pump 37 and the time required for acceleration of the wheel 15.

After the lapse of this constant time interval, the time delay network develops an H-potential as represented by the H-sample shown in square brackets and corresponding to the next phase of the operation at $t_4$.

The H-potential is applied to the input 50 of the flip-flop 48 which is switched over into its other state and delivers an H-potential to its output 51 and hence to the input 55 of the setpoint generator 53.

As a consequence, a descending ramp is applied as the setpoint value to the comparator 31 and the valve 34 is switched over to its return flow position, draining the chamber 36 to the reservoir 42.

As the pressure in chamber 36 falls, the spring 25 displaces the piston 24 to the left, reducing the volume of chamber 23b and increasing the braking force along the segment 8 of the characteristic curve shown in FIG. 1. This assumes, of course, that the piston 24 has not yet engaged the pin 28a to dislodge the valve member 29 from its seat.

During the delay period between the points $t_3$ and $t_4$ and over the stretch 6 of the curve, the wheel 15 generally has accelerated although the braking force remained constant. The braking force then increases until it once again exceeds the threshold 1 of 12 m/s$^2$.

If this occurs, the process is repeated, i. e. a new antiblocking control cycle is initiated as described.

If the braking force does not cross the threshold 1, it is because the wheel 15 has been decelerated sufficiently and there is no longer any danger of skidding. The piston 24 then reaches its extreme left-hand position, lifts the valve 29 from its seat and reconnects the master cylinder 13 with the wheel brake cylinder 18 so that normal brake operation under control of the foot pedal 10 is restored.

The antiblocking system described is particularly effective, as noted, for nondriven wheels, especially for the nondriven wheels of motor vehicles or for vehicles which are not self-propelled or do not have any motor driven wheels. Vehicles of the latter type including aircraft upper wheels may form part of the landing gear, or trailers which are towed by motor vehicles.

Figure 4:
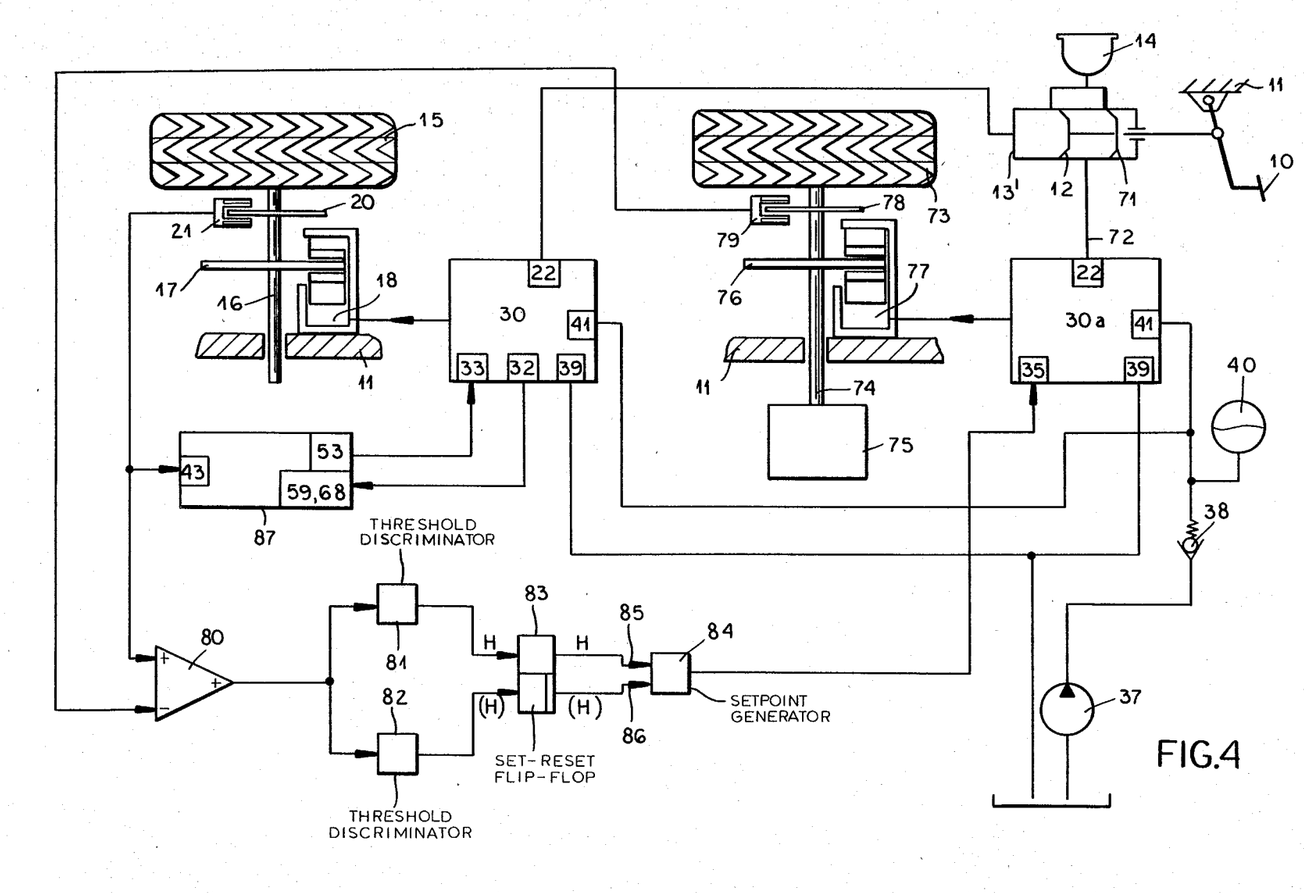
FIG. 4 shows the application of the invention to a vehicle having a driven wheel as well.

For vehicles which have motor driven wheels, the system shown in FIG. 4 can be used. In this FIGURE, elements which are the same as those of FIG. 3 have been designated with corresponding reference numerals and need not be described in detail.

In the system of FIG. 4, the brake pedal 10 operates a double-chamber master cylinder having a pair of pistons 71 and 12 respectively indicating the wheel brake cylinder 18 of the nondriven wheel as previously described and a further wheel brake cylinder 77 of a driven wheel 73.

The analog control system 30a which cooperates with the piston 71 for the driven wheel is similar in most respects to the system 30 for the nondriven wheel and hence to the system which has been described in FIG. 3.

From the master cylinder, a brake line pressurized by the piston 71 is connected to the normally open valve 22 which is in series with the wheel brake cylinder 77 or the driven wheel 73.

The wheel 73 is fixed to an axle 74 which is driven by the engine as represented diagrammatically at 75, it being understood that the usual transmission or troque transmitting systems can be provided for the drive wheel 73 as will customarily be provided in other motor vehicles.

The axle 74 carries a brake disc 76 which cooperates with a disc brake of the type previously described and provided with the wheel brake cylinder 77.

A disc 78 cooperates with a sensor 79 to form the tachometer indicating the angular velocity of the driven wheel 73 and hence the axle 74. This tachometer 78, 79 corresponds essentially to the tachometer 20, 21 previously described.

The output signal of the tachometer 21 is applied directly to the setpoint input of a comparator 80. The output signal from the tachometer 79 of the motor-driven wheel is treated as the actual value signal and is applied and directed to the actual value input of the comparator 80.

The comparator 80 is provided with a pair of threshold discriminators 81 and 82 whose outputs are applied to a set-reset bistable circuit such as the flip-flop 83 which can correspond to that of FIG. 3 and which is followed by a set-point generator 84 likewise corresponding to the setpoint generator 53 of FIG. 3 and whose inputs 85 and 86 correspond to the inputs 54 and 55 thereof.

The threshold discriminator 81 is set to respond to an output of the comparator 80 which is somewhat above the threshold of the discriminator 82. Consequently, the threshold circuit 81 reduces an output signal when the speed of the driven wheel 73 for some reason is less than that of the nondriven wheel 15, thereby signaling as skidding situation.

In the converse manner but analogously, the threshold discriminator 82 produces an output signal when the speed of the driven wheel is for some reason greater than of the nondriven wheel 15.

The reference numeral 87 represents the entire electronic control circuit of FIG. 3 which operates as previously described to vary the braking force on the nondriven wheel and is incorporated in total in FIG. 4.

When the speed of the driven wheel 73 is sufficiently below that of the nondriven wheel, the discriminator 81 has an output H, and the flip-flop 83 is triggered into a state in which its upper output has an H-potential which is applied to the upper input 85 of the setpoint generator 84.

The coil 35 of a servovalve of an analog hydraulic circuit 38, in all respects equivalent to the analog circuit 30 described in connection with FIG. 3, is energized. The servovalve operates the servopiston which reduces the hydraulic pressure in the wheel brake cylinder 77 and thus correspondingly reduces the braking force to allow the speed of the driven wheel to catch up to the nondriven wheel.

Conversely, if the discriminator 82 generates an output signal indicating that the nondriven wheel 15 is operating more slowly than the driven wheel, the flip-flop is tripped into its other stable state to apply the signal (H) to the input 86 of the setpoint generator which triggers the servovalve 35 into its other extreme position to increase the braking force in circuit 30a and slow the driven wheel to correspond to the speed of the rear wheel. Naturally these actions are only triggered in the event of overbraking of one of the wheels since, in the absence of such overbraking, the circuits 30 and 30a are ineffective and wheel braking is controlled exclusively by the pedal.

An important point to be noted is that in FIG. 4 the antiskid system is effectively a follower system for the driven wheel, the antiskid control elements represented at 87 being unsatisfactory as a duplicated unit for the driven wheel.

As is also apparent from FIG. 4, each of the wheels may have a respective tachometer 21, or one such tachometer can be provided for all of the nondriven wheels. In this case, the control system regulates the braking force of all of the nondriven wheels.

In four-wheel passenger vehicles, for example, one nondriven wheel can be provided with the complete system shown in FIG. 3 while all three of the other wheels can have follower-type control systems as provided in FIG. 4.

It has been found to be advantageous in such passenger vehicles to separately control at least two wheels along each side of the vehicle using the circuit of FIG. 4 so that automatic compensation for changes in the friction conditions met by the wheels on each side can be provided and the system can automatically respond to differences in friction along the opposite sides of the vehicle.

In all of the modifications described, we have found it to be advantageous to adjust the setpoint value, when the lower threshold is crossed at time $t_2$, so as to reduce the braking force further as represented toward the segment 5 of the curve of FIGS. 1 and 2 by an amount which is independent of the friction between the wheels and the ground surface and thus is constant. This constant value can correspond to twice the rotating moment of inertia of the wheel.

The antiskid and antibrake-locking system of the invention has a number of advantages. Firstly, it permits the braking force reduction and braking force increase in successive cycles under conditions in which cycling may occur and the brakes have a tendency to lock, to be spaced apart by the predetermined interval t and thus allows the braking-force reduction and following increase to be well defined.

The braking force reduction and increase also follow precise characteristic curves and thus are well defined to allow especially precise compensation of the effecting braking force to different friction conditions between wheel and road.

Since electronic timing circuits can be used with, for example, conventional RC time constant networks, the duration of the individual phases 4, 6 and 8 (FIGS. 1 and 2) can be varied simply by changing resistors of the time constant circuitry. This facilitates modification of the control circuit to suit various vehicle types, vehicle resonant conditions and the like so that resonant vibrations are avoided.

With this system the braking-force reducing system does not react upon the brake pedal in that there is no feedback thereby contributing materially to the comfort of the driver.

The system is also of a type which can be built into existing vehicles without difficulty.

We claim:

1. An antilocking brake system for a nondriven vehicle wheel having a wheel brake with a wheel-brake cylinder whose brake pressure is controlled by a brake pedal, said system comprising:
    (a) signal producing means including:
        means for measuring the angular velocity of the wheel and producing a first signal representing said angular velocity,
        at least one acceleration-rate limiter, and
        at least one differentiating network receiving said first signal for processing said first signal and delivering the respectively processed first signal respectively to first and second threshold-valve discriminators connected to said network and producing respectively a second output signal upon the deceleration of said wheel exceeding a first threshold value of substantially 10 m/s$^2$, and a third output signal when said deceleration is below a second threshold value of about 10 m/s$^2$ but lower than said first threshold value;
    (b) electrohydraulic analog control means including:
        a setpoint/actual value comparator producing a difference signal,
        an adjustable valve connected to said comparator and responsive to said difference signal,
        a braking-force reducer operated by said valve and having a spring-loaded setting piston controlling the volume of said wheel-brake cylinder independently of said brake pedal,
        means for delivering said second signal to said comparator as a setpoint signal, and
        means responsive to the displacement of said setting piston for generating an actual value signal and applying said actual value signal to said comparator whereby said braking-force reducer upon overbraking reduces the braking force upon said wheel;
    (c) means for temporarily storing a signal value representing the braking force as said first signal falls below said second threshold value and, at least in part in response to the stored signal value, modifying said setpoint value to induce a further reduction in braking force, said valve terminating reduction in brake force upon said actual valve signal corresponding to the modified setpoint value;
    (d) means responsive to the means for temporarily storing said signal value for delaying further change in said brake force while the friction between said wheel and a road surface engaged thereby remains constant, for a predetermined brief period; and
    (e) means effective after the lapse of said period to increase said brake force and, upon the deceleration of said wheel again exceeding said first threshold value to repeat the operation of said analog control means in response to overbraking.

2. The antilocking brake system defined in claim 1 wherein said means for temporarily storing said signal value includes a sample-and-hold circuit receiving an input from said means responsive to the displacement of said setting piston, triggered by said second discriminator, and having an output, a further comparator receiving said actual value signal from said sample-and-hold discriminator output and a further signal representing the sum of said actual value signal and a reference signal, said further comparator being connectable to the first mentioned comparator for varying the setpoint signal thereof.

3. The antilocking brake system defined in claim 1 wherein said means for delivering said second signal and said means for applying said actual value signal to said comparator comprises a setpoint generator having a pair of inputs and adapted to generate ascending and descending voltage ramps depending upon the input which is energized, and a set-reset flip-flop having its output terminally connected to said inputs of said setpoint genertor, said discriminator being connected to inputs of said flip-flop.

4. The antilocking brake system defined in claim 1 wherein said pedal operates a master cylinder connected to said wheel-brake cylinder, said system further comprising a blocking valve between said accelerators and operable by said setting piston, said setting piston being provided with displacement-measuring means for generating said actual valve signal.

5. The antilocking brake system defined in claim 1 for a vehicle having, in addition, a driven wheel, further comprising a follower circuit responsive to differences in speed of said wheels for selectively operating wheel brakes thereof.

6. An antilocking system for a hydraulically operated motor vehicle brake with a speed sensor for a nondriven vehicle wheel providing an electrical output measuring the speed thereof, an evaluating circuit connected to this sensor for differentiating this output signal in a differentiator and where, when the differentiated signal exceeds a first speed deceleration threshold a first signal is applied to energize a magnetic valve to reduce the brake pressure and when the differentiated signal falls below a second speed deceleration threshold lying below the first-mentioned speed deceleration threshold a second signal is applied to this magnetic valve to terminate the reduction of brake pressure and the brake pressure is held constant until it begins to rise again, the improvement wherein:
(a) a rate limiter (43) is provided between said sensor (21) and said differentiator (44);
(b) the first threshold (1) corresponds to a peripheral speed-deceleration of said wheel (15) of 10 m/s$^2$;
(c) the second speed deceleration threshold is also about 10 m/s$^2$ but less than the first speed deceleration threshold;
(d) means is provided for continuing the brake force reduction after the deceleration has fallen below said second threshold by an amount corresponding to at least twice the brake force required for a braking of the rotational moment of inertia of the wheel and for thereafter maintaining the brake force constant for a predetermined period of time; and
(e) the magnetic valve (34) is a servovalve connected in an electrohydraulic analog control circuit (30) having an actual value input from a displacement measuring system (27) responsive to the displacement of a brake force reducer (23) connected to a master cylinder (13) and a setpoint value from a setpoint generator (53), said electrohydraulic analog control circuit generating an output shifting the magnetic valve in accordance with the threshold for selective brake force reduction, for maintaining the brake force constant and for increasing the brake force.

7. The improvement defined in claim 6 wherein the vehicle also has a driven wheel wherein the nondriven wheel (15) is coupled with the driven wheel (73) by a speed follower control circuit in which the setpoint derives from the speed sensor (21) of the nondriven wheel (15) and the actual value from a speed sensor (79) of the driven wheel and the latter circuit includes a comparator (80) receiving the setpoint and actual values from said sensors and the latter control circuit also includes two threshold discriminators (81) and (82) which are effective when predetermined speed differences between the wheels exceed or fall below these thresholds.

* * * * *